United States Patent [19]

Dourén

[11] Patent Number: 5,800,788
[45] Date of Patent: Sep. 1, 1998

[54] REACTOR CONTAINER, PLANT AND PROCESS FOR THE PRODUCTION OF SULFURIC ACID

[75] Inventor: Lars Dourén, Stenungsund, Sweden

[73] Assignee: Sandvik AB, Sandviken, Sweden

[21] Appl. No.: 656,227

[22] PCT Filed: Oct. 3, 1995

[86] PCT No.: PCT/SE95/01122

§ 371 Date: Aug. 15, 1996

§ 102(e) Date: Aug. 15, 1996

[87] PCT Pub. No.: WO96/11876

PCT Pub. Date: Apr. 25, 1996

[30] Foreign Application Priority Data

Oct. 13, 1994 [SE] Sweden ................. 9403471

[51] Int. Cl.$^6$ ............ C01B 17/48; C01B 17/80; C01B 17/765
[52] U.S. Cl. ............................ 422/161; 423/522
[58] Field of Search ................. 423/522, 533; 422/160, 161

[56] References Cited

U.S. PATENT DOCUMENTS

| | | | |
|---|---|---|---|
| 2,819,947 | 1/1958 | Stahl | 423/522 |
| 3,404,955 | 10/1968 | Dreschel et al. | 423/533 |
| 3,432,995 | 3/1969 | Jaeger | 55/179 |
| 3,656,900 | 4/1972 | Dreschel et al. | 423/522 |
| 3,752,884 | 8/1973 | Sasse | 423/522 |
| 3,818,088 | 6/1974 | Sasse | 423/522 |
| 4,296,088 | 10/1981 | Stauffer | 423/533 |
| 4,591,494 | 5/1986 | Cameron et al. | 423/522 |
| 4,591,495 | 5/1986 | Cameron | 423/522 |
| 4,687,656 | 8/1987 | Quang et al. | 423/533 |

FOREIGN PATENT DOCUMENTS

| | | |
|---|---|---|
| 1544066 A1 | 2/1970 | Germany . |
| 330003B | 11/1970 | Sweden . |

*Primary Examiner*—Gary P. Straub
*Attorney, Agent, or Firm*—Burns, Doane, Swecker & Mathis, L.L.P.

[57] ABSTRACT

A new chemical reaction container (43) is provided which is suitable for a process plant the production of sulfuric acid according to the contact process. It comprises a cylindrical envelope surface and is divided by vertical separation walls into at least two sections, usually three. Each section has an inlet and an outlet, the separation walls at their bottom parts having one or several openings for making contact possible between the different sections. The advantage of this is that both the drying of the process gas, the interpass absorption step and the final absorption step may be conducted in one and the same reactor, instead of three separate reactors, as done previously. This saves both space and material. Further are provided a plant and a process for the production of sulfuric acid according to the contact process, which plant and which process comprise the above reactor container.

8 Claims, 3 Drawing Sheets

REACTOR CONTAINER, PLANT AND PROCESS FOR THE PRODUCTION OF SULFURIC ACID

BACKGROUND OF THE INVENTION

The present invention relates to a new reaction container and a new plant for the production of primarily sulfuric acid and a new process for the production of primarily sulfuric acid, the process relating to the so called contact process.

Sulfuric acid belongs to the basic chemicals and is the basis for a large spectrum of other products, such as hydrochloric acid, aluminum sulfate, ammonium sulfate, calcium sulfate and superphosphate. Thus, it occupies a central position in the chemical industry.

There are two industrial methods for the production of sulfuric acid, viz. the contact process and the leaden chamber process. The leaden chamber process is the oldest process and is hardly used anymore.

When producing sulfuric acid according to the contact process, one starts off from elementary sulfur, sulfur-containing minerals and/or unclean sulfuric acid. For the two former cases, the raw material is burnt to sulfur dioxide which in turn is oxidized to sulfur trioxide, which is absorbed in sulfuric acid of different concentrations, depending upon whether the final product shall be 94 to 98% or oleum. The contact mass or the catalyst for the oxidation is usually vanadium pentoxide mixed up with potassium-aluminum silicate or any other unmeltable substance. In order to further elucidate the generally used contact process, this will now be described with reference to FIG. 1.

The raw material sulfur dioxide flows in into the conduit 1 from a sulfur dioxide source (not shown). This sulfur dioxide is obtained for instance by combustion of elementary sulfur, pyrite or so called iron sulphide ore concentrate. Before this is led through the conduit 1, it has usually been cooled to about 40° C., this heat being used for, e.g., steam production. To the conduit 1 is connected a conduit 2, out of which streams dried air which is mixed with the sulfur dioxide in order to adjust the right $SO_2$ concentration by dilution, and in order to add $O_2$ for oxidation. This air is led via a conventional air filter 4 to a drying tower 3 where it is dried by concentrated sulfuric acid. At its bottom end, the conduit 1 opens into a drying tower 5, in which the temperature is kept at between about 60° and 80° C. In this drying tower, the gas mixture of sulfur dioxide and air is dried by sulfuric acid. This tower is filled with, e.g., raschig rings or berl saddles. Before the gas mixture leaves the drying tower, it flows through a demister 6.

The drying in the drying tower 5 is necessary for avoiding the creation of a $H_2SO_4$ mist in a later process step, which constitutes an important inconvenience for the environment and for the equipment.

After the drying, the gas mixture is pumped over a conduit 7 into a contact tower or converter 8, where it comes in contact with the hot catalyst mass (about 420° C.) on several levels, whereby the conversion of $SO_2$ to $SO_3$ takes place. This reaction is strongly exothermic (about 100 kJ/mole converted $SO_2$) and in order to maintain a suitable temperature level, the gas is let to pass a system of heat exchangers according to FIG. 1. Thus, the inflowing gas is first heat-exchanged in a heat exchanger 9 with a gas mixture mainly consisting of pure $SO_3$ and air relating from the bottom part of the contact tower 8, which is led over a conduit 10. Thereby, the temperature of the gas flowing in from conduit 7 is increased. In order to further increase the temperature of this gas, it is thereafter led through a second heat exchanger 11 and is heat-exchanged in this heat exchanger with a gas side-outtake 12 from the contact tower 8, which is reintroduced into the contact tower after having flown through the heat exchanger 11, usually into the same level.

In order to improve the heat economy, also a part stream 13 is taken out from a lower level in the contact tower 8, which part stream is cooled in a heat exchanger 14 and then led over a conduit 42 into an intermediate absorption tower 15, where the sulfur trioxide is absorbed by concentrated sulfuric acid and the sulfur dioxide is returned over a conduit 17 to the contact tower 8 via the heat exchangers 14 and 16, in which it is preheated before being reintroduced into the contact tower. In the latter heat exchanger 16, it is preheated by a side outtake 18 which is reintroduced into a lower level of the contact tower after having streamed through the heat exchanger. The absorption tower 15 is often called "IPAT" which stands for "Interpass Absorption Tower".

After having been cooled in the heat exchanger 9, the product stream, mainly consisting of sulfur trioxide and air, is led to the final absorption tower 19 (often called "FAT" which stands for "Final Absorption Tower"), via a conduit 41. In this tower, $SO_3$ is absorbed by concentrated sulfuric acid, whereafter mainly pure air is led into the atmosphere via the top tube 20, after having been cleaned in the demister 21 from possibly occurring sulfuric acid. The tower 19 (as well as the tower 15) is usually filled with ceramic packing elements, e.g. raschig rings or berl saddles.

Each of the drying tower 5, the interpass absorption tower 15 and the final absorption tower 19 are linked to a separate loop for concentrated sulfuric acid, which loops are interconnected. Starting from the last loop, concentrated sulfuric acid is pumped from a pump tank 22 over a conduit 23 into the top of the final absorption tower 19 and meets the rising gas mixture of $SO_3$ and air, whereby the water content in the sulfuric acid binds the sulfur trioxide and increases the concentration further. Depending on the water content, also substantially water-free oleum may be produced. This product stream is reintroduced into the pump tank 22 over the conduit 24. Since the absorption reaction in FAT is strongly exothermic, the incoming stream of sulfuric acid is cooled in a heat exchanger 27, which normally is water-cooled.

A portion of the concentrated sulfuric acid (or oleum) is diverted to a second pump tank 25 over a conduit 26. A stream of sulfuric acid is circulated via this pump tank to the interpass absorption tower 15 over a connecting conduit 28 and a recycling conduit 29. Also this stream is cooled by means of a heat exchanger 30. To the pump tank 25 is also led the necessary water for the absorption of sulfur trioxide over a connecting conduit 31. Of course, the added amount of water, in cooperation with the other running parameters, determines the concentration of the final product.

A portion of the sulfuric acid is drawn off from the conduit 28 over a conduit 32 to the loop which serves the drying tower 5. Said drawn-off sulfuric acid is led to a pump tank 33, through which the sulfuric acid intended for the drying in drying tower 5 is circulated. This sulfuric acid is led through a conduit to the upper part of the drying tower 5 and is let to stream downwardly (for instance over ceramic packing elements) in order to absorb possibly occurring moisture. After this, it is reintroduced over the conduit to the pump tank 33. Since the drying process is exothermic, the reaction heat is cooled away in a heat exchanger 36, which is usually water-cooled. A part of the sulfuric acid in the conduit 34 is deviated through a conduit 37 to the stripper 3, in which the sulfuric acid is cooled and the incoming reaction air is heated, besides that it is also pre-dried by the

3 absorption of possible moisture. The stripper 3 may also be filled with ceramic packing elements, such as raschig rings or berl saddles. After having flown through the stripper 3, the sulfuric acid is reintroduced into pump tank 25 via a conduit 38. A portion of this stream is drawn off via a conduit 39, this stream constituting the very product stream, possibly after having been cooled in a heat exchanger 40.

From the above description for a conventional sulfuric acid plant according to the contact process, it may be easily established that a large amount of equipment is required in the form of absorption towers, conduits, pumps, tanks, heat exchangers, etc. Nowadays these are usually made of special corrosion-resistant steel alloys, which can withstand lengthy contacts with concentrated sulfuric acid and oleum. For instance, the austenitic steel "Sandvik SX" (registered trademark) has proved to be very capable as a construction material for sulfuric acid plants. This steel is further described in GB-A-1 534 926. However, it is relatively expensive, wherefore it would be desirable to diminish its consumption. Further, the plant is relatively bulky and space-demanding, wherefore it would be desirable to reduce the necessary plant surface.

SUMMARY OF THE INVENTION

Thus, a primary object of the present invention is to diminish the consumption of construction material for chemical processes in general and for sulfuric acid plants being based on the contact process in particular.

A second object of the present invention is to reduce the necessary plant surface for such process plants.

These and further objects have been achieved by a process and a device, respectively, which comprise the features as defined in the characterizing clauses of the claims.

BRIEF DESCRIPTION OF THE DRAWINGS

For illustrative but non-limiting purposes, the invention will now be further described with reference to the appended drawings, which are briefly presented underneath.

DETAILED DESCRIPTION OF THE INVENTION

Figure 1:
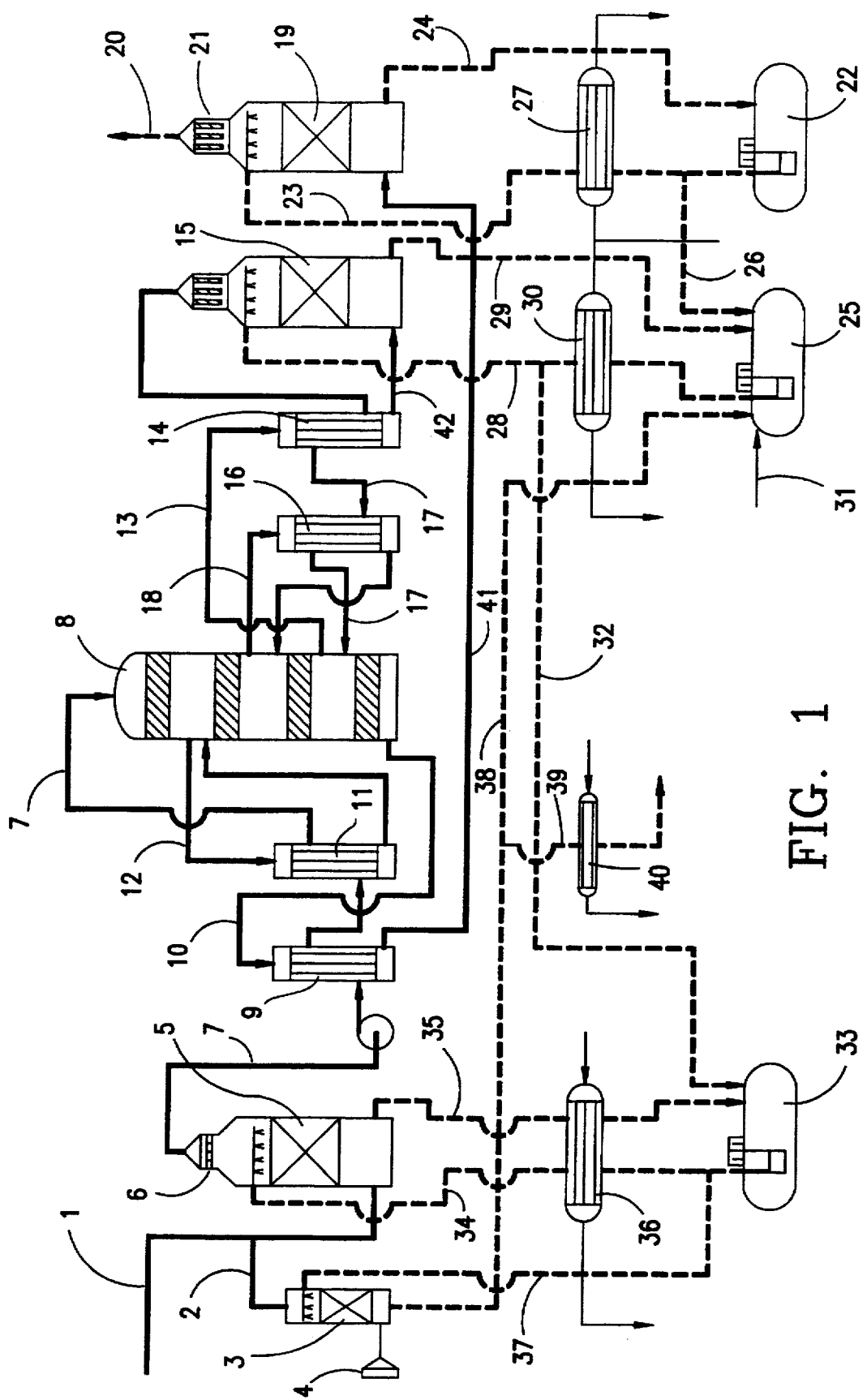
FIG. 1 shows a flow scheme according to the state of the art, which has been presented above.
Figure 2:
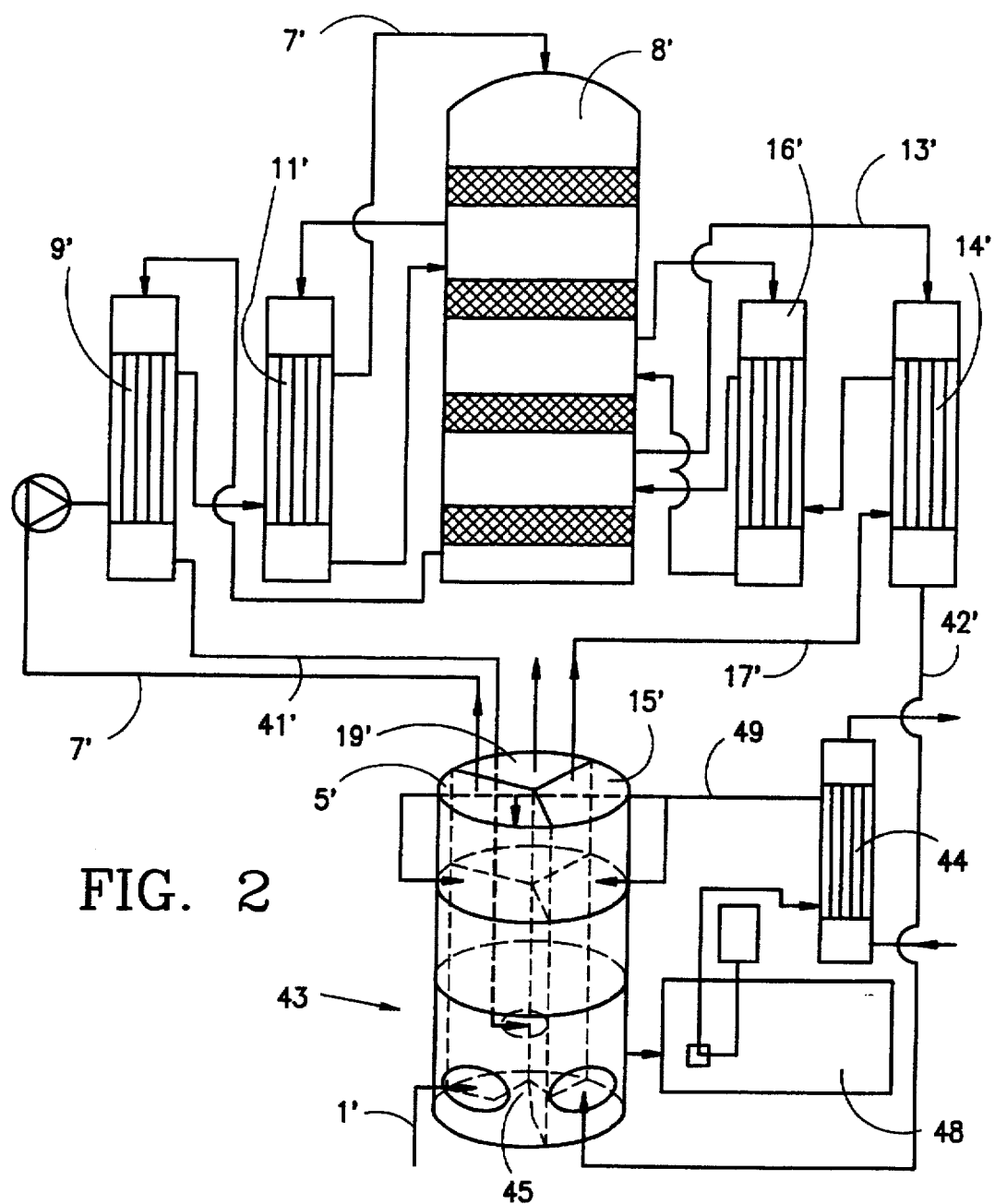
FIG. 2. shows a flow scheme of a plant according to the present invention.
Figure 3:
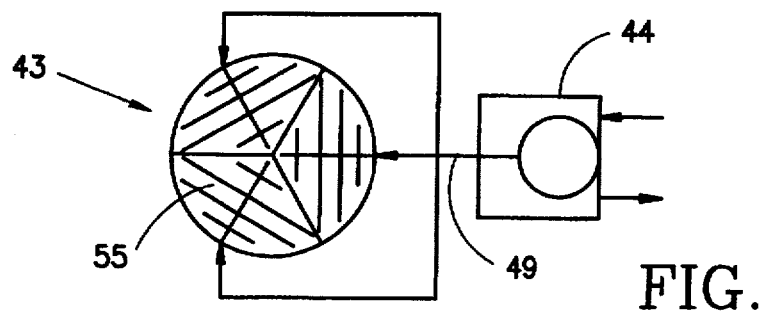
FIG. 3 shows a basic sketch of an absorption tower according to the invention, in a top view.
Figure 4:
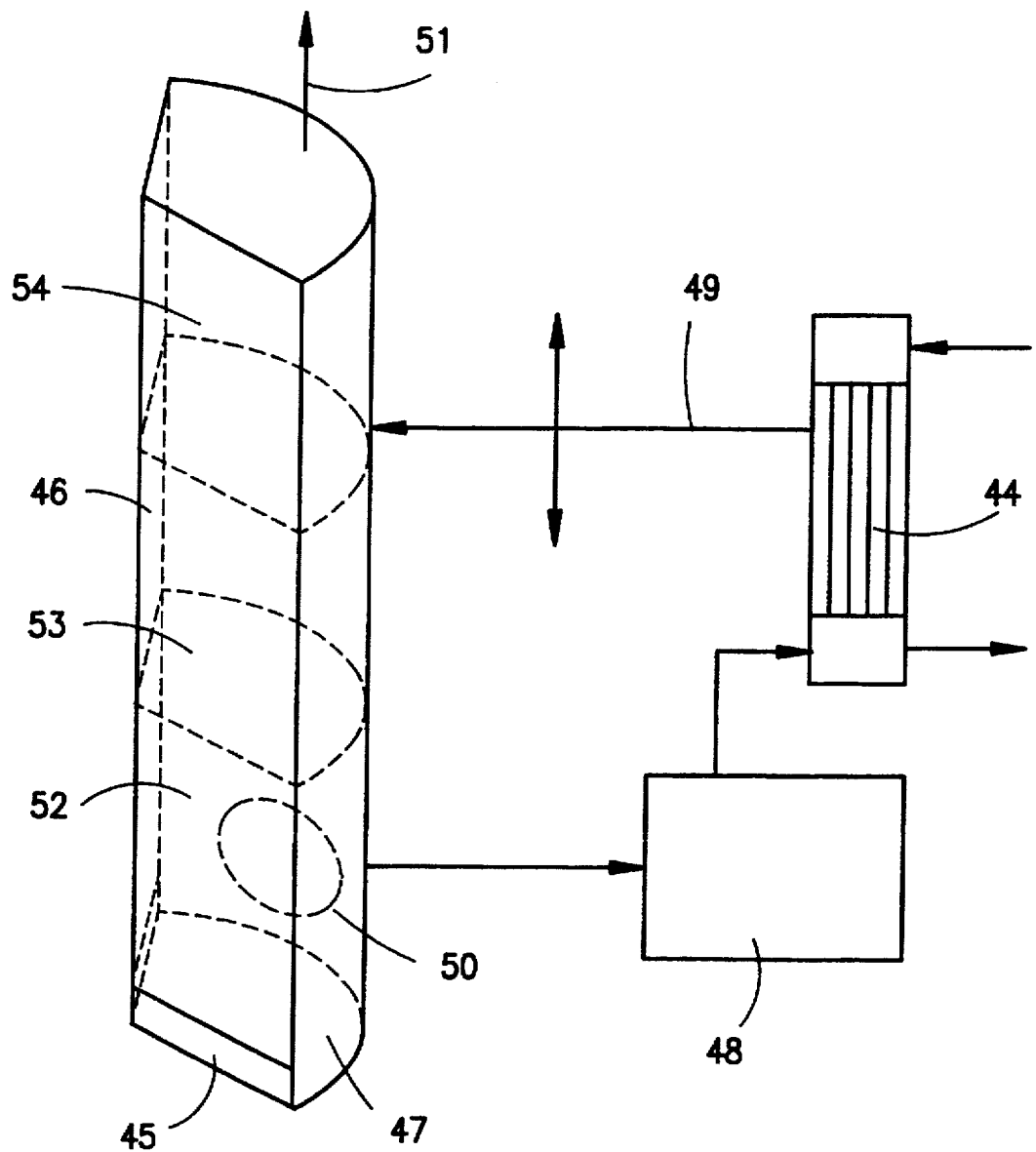
FIG. 4 shows a basic sketch of a section of the absorption tower according to the invention.

Firstly it is mentioned that corresponding parts in the FIG. 2 to 4 have been allotted the same reference numerals as in FIG. 1, however provided with a prime sign.

In FIG. 2 there is a contact tower 8', which corresponds to the tower 8 in FIG. 1 and is of the same construction. To this tower are connected four heat exchangers 9', 11', 14' and 16', which are connected to each other and to the contact tower, respectively, in the same way as in FIG. 1, wherefore this is not described once again.

The essential feature of the present invention is that the three towers 5, 15 and 19 have been replaced by one single multisectional tower 43, which in the illustrated case is divided into three sections 5', 15' and 19'. Of course, this saves considerable amounts of construction material, which is of the utmost importance when this consists of expensive special steel. Moreover, large amounts of tubes and other equipment is saved. The components of tower 43 are suitably welded together, although screw joints are also feasible.

Hence, according to the invention the product gas stream is led from the contact tower 8' via the heat exchanger 9' to the bottom part of the FAT or final absorption section 19' in the multisection tower 43, where it in counter-current meets the downwardly flowing concentrated sulfuric acid. According to a preferred embodiment of the present invention, this sulfuric acid comes from a heat exchanger 44 which is common for all three sections and which preferably is water-cooled, like the three coolers 27, 30 and 33 according to the state of the art. This sulfuric acid is pumped from the bottom of the tower 43, in which it has free access and is allowed to flow freely between the three sections via openings 45 in the lower parts of the separation walls 46. These openings may for instance consist of a gap between the bottom edge of the separation wall and the bottom 47 of the tower, or of one or several holes in the lowermost parts of the separation walls. The sulfuric acid on the bottom of the tower functions simultaneously as a water seal for the three gas streams, each one of which is introduced into separate openings 50 and is diverted at the top of each section (see 51 in FIG. 4), while not being allowed to intermix. The sulfuric acid is pumped from any of the sections in the tower 43 by a pump in a pump tank 48 to the cooler 44, in which it is cooled and then reintroduced to the three sections over a branched conduit 49. Thus, also the number of coolers may be reduced from three according to FIG. 1, to a single one.

The basic construction of a section in tower 43 is shown in FIG. 4. The bottom part 52 accomodates the collected sulfuric acid, and above its liquid surface, the gas inlet 50. The middle part 53 accomodates suitable packing elements, such as ceramic raschig rings, berl saddles or structured packing elements of stainless steel such as "Sandvik SX" (registered trademark). For the FAT and IPAT sections the upper part 54 consists of a gas collecting chamber which is empty as such, while for the air drying section 5' it may be filled with a normally used demister material. Between parts 53 and 54 liquid distributors 55 are arranged for an even inflow of sulfuric acid over the whole cross-section of the section. These distributors may for instance consist of a radial main pipe with a plurality of perpendicular branch pipes, whose undersides have a plurality of holes for an evenly distributed outflow of sulfuric acid.

Analogously to FIG. 1, the process air is introduced through conduit 1' at the bottom of the drying section 5', from whose upper part it is pumped through the conduit 7' to the contact tower 8' via heat exchangers 9' and 11', in which it is preheated.

As may be clearly seen from the above, a multisectional tower according to the present invention saves both material and space. According to two preferred embodiments, also the number of pump tanks and coolers, respectively, may be reduced from three to one, which further highlights the favourable impact of the present invention on cost and required surface, for instance when building a new plant. Several different construction materials may be used; however the austenitic quality "Sandvik SX" (reg. trademark) has turned out to be particularly resistant in a sulfuric acid environment.

The invention has been described above in relation with the preferred embodiment according to which three towers (air drying tower, final absorption tower and interpass absorption tower) have been combined into one tower. According to another suitable, however less preferred embodiment, it is possible to combine only two of the three towers into a bisectional tower, the third tower remaining unaffected. According to this embodiment, the tower is divided into two substantially similar halves of semi-circular cross-sectional shape.

It is true that the invention has been described in connection with the production of sulfuric acid. However, the tower according to the invention may without any problems also find applications in other chemical process plants, such as for the production of phosphoric acid and nitric acid.

I claim:

1. A reaction container for chemical process plants comprising a substantially cylindrical envelope, closed at both ends, having an inner surface and an outer surface, and a central axis extending from end to end, the reaction container being divided into two or more substantially pie-shaped sections by two or more substantially planar, separation walls extending from one end of the cylindrical envelope to the other end and extending from the inner surface to the central axis, each sections having at least one inlet and one outlet, both of which pass through the inner and outer surfaces of the reaction container, each separation wall having one or more openings to allow flow of fluids through the separation wall between two adjacent sections.

2. The reaction container according to claim 1, for the production of sulfuric acid, wherein the reaction container is substantially vertical with respect to its central axis, so that one closed end forms a bottom and the other closed end forms a top, and has three sections extending from top to bottom with each section having a substantially pie-shaped cross-section.

3. The reaction container according to claim 2, wherein each section has a lower portion, for collecting liquid; a middle portion, for accommodating packing elements; and an upper portion for collecting gas.

4. The reaction container according to claim 3 wherein the upper portion is filled with a droplet trapping means.

5. A plant for the production of sulfuric acid according to the contact process, comprising a contact tower for the conversion of sulfur dioxide into sulfur trioxide, wherein the contact tower is comprises of a least one reaction container of claim 2.

6. The plant according to claim 5, wherein each section of the reaction container, at its bottom, is connected to the same pump tank, and at its upper part, each section is connected to the same heat exchanger.

7. The plant according to claim 6, wherein downstream, the pump tank is connected to the heat exchanger.

8. Plant according to claim 5, wherein:
(a) one of the three sections is a drying section through which incoming process air is dried by sulfuric acid streaming downwardly,
(b) another section serves as an interpass absorption tower through which a product stream from a contact tower streams upwardly in countercurrent to sulfuric acid streaming downwardly, and
(c) a third section serves as a final absorption section through which a product stream from the lowermost part of the contact tower flows upwardly, countercurrent to sulfuric acid streaming downwardly.

* * * * *